(No Model.)　　　　　　　　　　　　　　　　2 Sheets—Sheet 1.
J. S. BRIGGS.
FRUIT STONING MACHINE.
No. 460,740.　　　　　　　　　　　Patented Oct. 6, 1891.
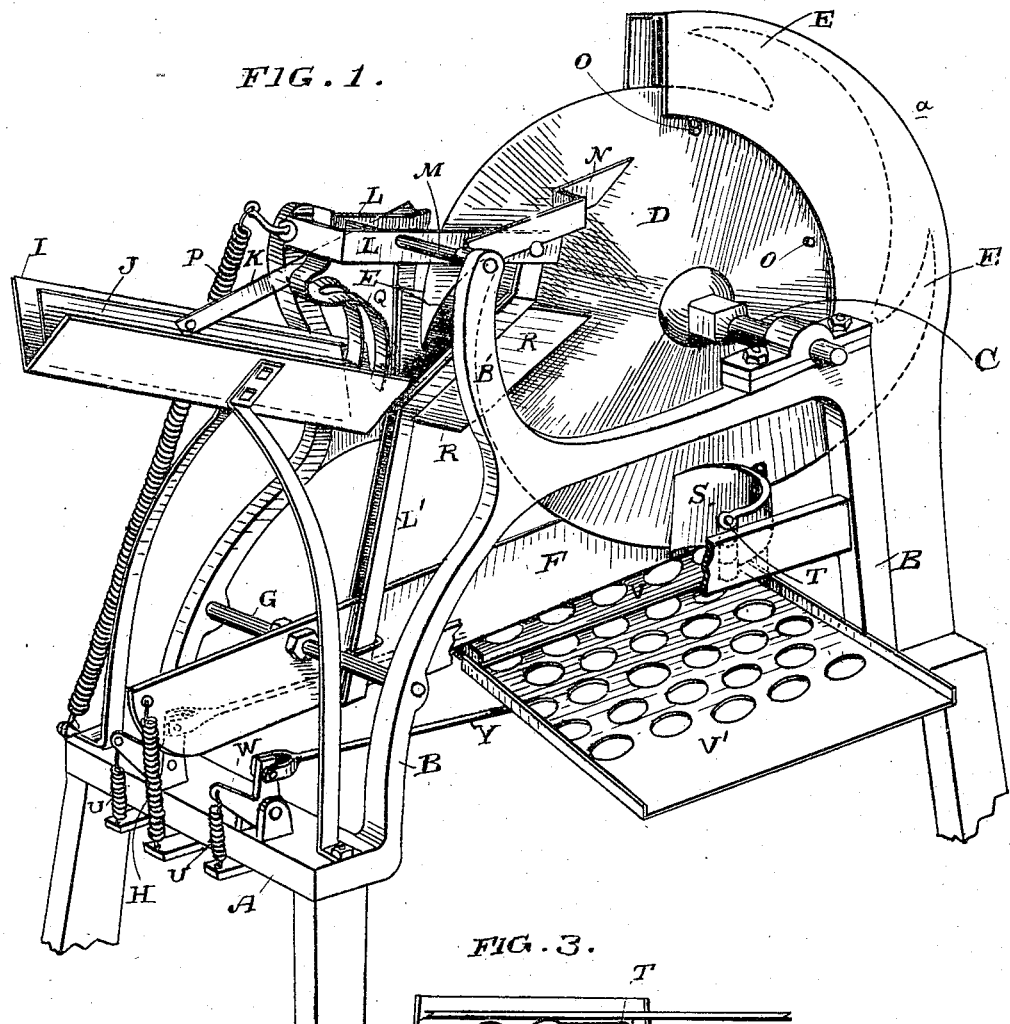
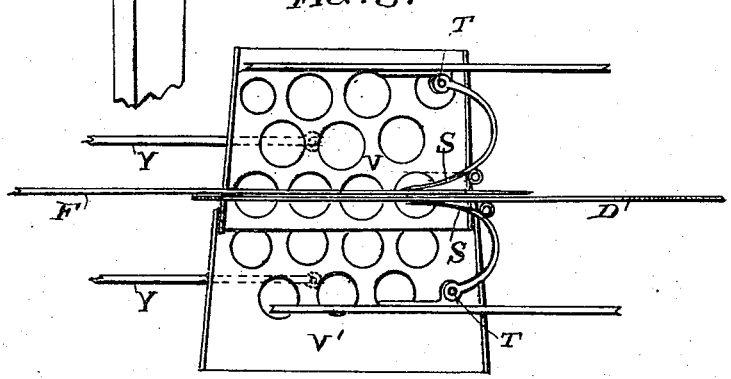

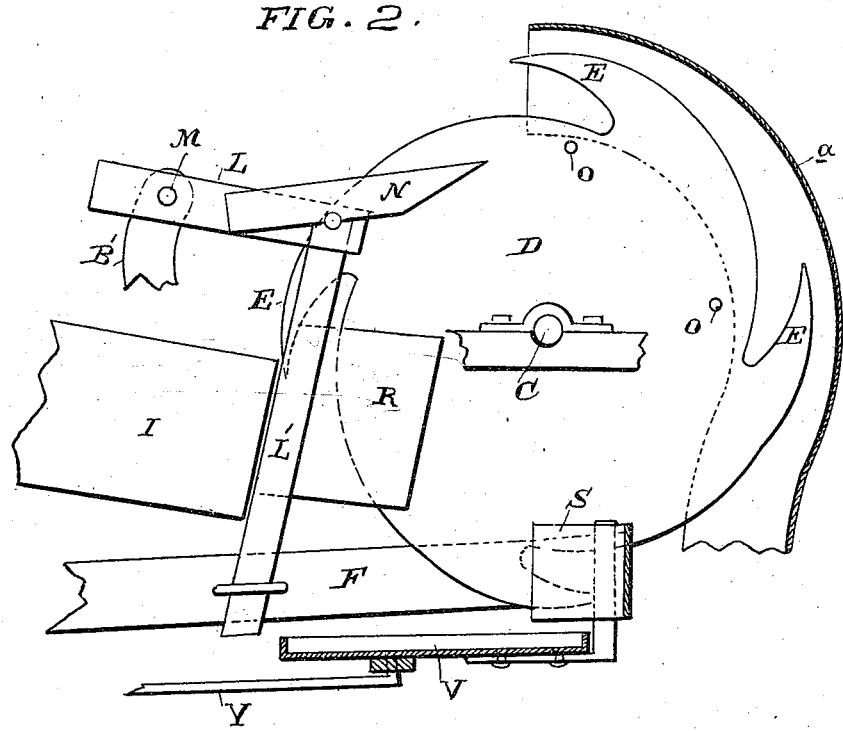

UNITED STATES PATENT OFFICE.

JOHN SMITH BRIGGS, OF SAN BUENAVENTURA, CALIFORNIA.

FRUIT-STONING MACHINE.

SPECIFICATION forming part of Letters Patent No. 460,740, dated October 6, 1891.

Application filed February 10, 1891. Serial No. 380,953. (No model.)

*To all whom it may concern:*

Be it known that I, JOHN SMITH BRIGGS, a citizen of the United States, residing at San Buenaventura, Ventura county, State of California, have invented an Improvement in Fruit-Stoning Machines; and I hereby declare the following to be a full, clear, and exact description of the same.

My invention relates to an apparatus for cutting fruit and removing the stones or pits therefrom, it being especially applicable to such fruits as apricots, peaches, plums, and the like.

It consists in certain details of construction, which will be more fully explained by reference to the accompanying drawings, in which—

Figure 1 is a perspective view of my apparatus. Fig. 2 is a side elevation especially showing the relative arrangement of the rotary cutting-disk, knife, feed and transfer chutes, and other connected parts. Fig. 3 is a plan view showing the arrangement of the cutting-disk, yielding knife, and the devices for removing the fruit from the pits.

A is a frame-work of any suitable construction adapted to support the necessary machinery.

B are the standards of the iron frame-work, having the shaft C journaled at the top, and this shaft has fixed upon it the rotary cutting-disk D and is driven by hand or other power. This disk has four or any other suitable number of projecting cutters E, having sharp edges, and it rotates in a plane parallel with and close to a cutting-knife F, which is supported upon a fulcrum-shaft G from the main frame. The rear end of this knife has a spring or weight, as shown at H, by which this end is drawn downward, and the end which is by the side of the rotary disk and which has a sharp edge upon it is forced upward, so that the fruit, when delivered, will be cut by the edges of the disk and cutters E and also by the blade F.

The fruit is delivered to the cutter through a V-shaped trough I, and this trough has within it a sliding or reciprocating side J, which rests against one side of the trough, and when the fruit is placed in the trough one side of it rests against the side he trough and the other against this reciprocating plate. The shape of the trough is such as to cause the fruit in moving down to assume a position with its longer axis in the plane of the cutters, to which it is presented.

K is a link or conecting-rod, which unites the plate J with an oscillating frame L, jour-upon a shaft M, which is supported in upwardly-projecting lugs B' of the frame B, as shown.

The frame L has an arm N projecting parallel with and close to the disk D, and this arm is engaged as the disk rotates by the projecting pins O, so that as each pin strikes the arm N it presses it downward and tilts the rectangular frame L about its fulcrum-shaft M. As soon as the pin O has passed the arm N a spring or weight P, which is connected with the rear end of the frame L, will act to draw the frame down again and throw the arm N up ready to be engaged by the next pin O. This action operates, through the connecting-rod K, to oscillate the plate J within the trough I, and it thus serves to move the fruit forward and prevent its sticking in the feed-trough.

Connected with the frame L is an elastic forked plate Q, the forked end of which projects down into the trough I and prevents more than one fruit at a time from passing out of the discharge end of the trough. This fork is alternately raised and depressed by the oscillations of the frame L, and when it is raised it allows a single fruit to escape from the lower end of the trough I and be deli ed into a short carrier-trough R, which is ured to the guide-arms L', attached to the front end of the frame L and extending downwardly through staples or guides upon the sides of the knife-bar F. The tilting of the frame L moves these arms L' alternately up and down, and they carry with them the short carrier-trough. This trough is depressed so as to stand opposite the discharge end of the trough I, and it receives a single fruit within it. As the arm N is leased from the pin O the frame rises and with it the  rier-trough R, which forces the fruit against the sharp cutters E of the disk D, and as the disk continues to rotate it presses the fruit upon the yielding knife F, which stands, as before described, as nearly as possible in the plane of movement of the cutting-disk. When the fruit is first seized by the cutters, the carrier is again moved down so as to relieve the fruit from pressure and prevent its being bruised, and the cutters then remove it easily from the carrier. By means of the cutters of the disk, which surround a considerable portion of the fruit, and the blade F, which occupies the opposite side, the meat is cut through to the pit, and the pit is temporarily held between the edge of the blade F and the notch formed by the cutters E, while the meat is pulled off the fruit by means of the semicircular stripper-plates S. These plates have their outer edges hinged, as shown at T, and their inner edges are curved so as to lie in close contact with the knife F and the revolving disk, so that as the fruit is carried forward by the movement of the disk the inner edges of these plates will be hooked into the cut which has been made around the pit, and as the pit is carried forward by the further movement of the disk the plates S will move backward and outward about their hinges T and in separating will pull the meat off the pit. Springs U are connected with these plates S, and as soon as the plates are free from the fruit and the pit the springs will draw them back again in position to receive the next fruit. Beneath these plates S is the inclined table formed of the two overlapping plates V V'. At one end these plates are connected with a bell-crank lever W, and at the other end they are connected by arms Y with the curved plates S, so that as the plates S are moved backward and outward around their hinges they act upon the tables V, and as soon as they are released the bell-crank lever W and the spring U act to return the tables to their normal position, thus giving them a slight jar, which will cause the fruit and any pits which fall with the fruit to move upon the tables. Holes are made in these tables of sufficient size to allow the pits to fall through, while the meat, being more bulky, will pass over the surface of the table and eventually be dischaged into any suitable receptacle.

By means of a hood $a$, fixed behind the cutter-disk, the pits are directed into a convenient receptacle, the hood being slotted to allow the disk to turn through the slot.

Having thus described my invention, what I claim as new, and desire to secure by Letters Patent, is—

1. In a machine for cutting fruit and removing the pits therefrom, the revolving toothed disk having the sharpened edges, the hinged yielding knife operating in conjunction with the disk and in a plane parallel with and close to the disk, and the curved hinged plates having edges which press against the cutting-blade and enter the cut made in the fruit, said plates acting to pull the meat from the pit while the latter is held between the knife and the rotary disk, substantially as herein described.

2. In a fruit-cutting and pit-removing apparatus, the rotary toothed disk having the cutting-edges, a yielding knife hinged below and approximately in plane with the disk, and the curved plates adapted to seize the meat of the fruit and remove it from the pit, in combination with the tables adapted to receive the fruit when it is separated and having holes through which the pits may pass, substantially as herein described.

3. The combination, in a fruit-pitting machine, of a rotary toothed disk having sharpened edges, the yielding knife reciprocating approximately in plane with the disk and acting in conjunction therewith to cut the fruit around the pit, the curved hinged stripping-plates having their edges held in contact with the cutting-blades and adapted to enter the cut made in the fruit, so as to pull it off the pit by the outwardly-swinging motion, and the inclined perforated tables situated beneath the disk and strippers, having one end connected with the stripping-plates and the other with the bell-crank lever and returning-spring, substantially as herein described.

4. A fruit-cutting and pit-removing device consisting of the rotary toothed disk with sharpened edges, the yielding knife reciprocating beneath and standing approximately in the plane of the cutting-disk and having an edge which acts in conjunction therewith, a trough through which the fruit is delivered to the cutting disk and knife, and a reciprocating plate fitted into one side of the trough, with mechanism whereby said plate is caused to reciprocate to move the fruit forward and prevent its sticking, substantially as herein described.

5. A fruit-cutting and pit-removing device consisting of the rotary toothed disk with the sharpened edges, the yielding knife journaled to move in approximately the plane of the disk, a trough by which the fruit is delivered to the disk and knife, a tilting frame, and a vertically-moving carrier connected therewith, receiving the fruit from the trough and delivering it into the concavity of the cutters of the rotary disk and upon the edge of the cutting-knife, substantially as herein described.

6. The fruit-pitting device consisting of the rotary toothed cutting-disk and the yielding cutting-blade acting in conjunction therewith, the feed trough or chute with its reciprocating plate, the movable carrier receiving the fruit from the trough and delivering it to the toothed disk and knife, and the forked elastic plate Q, with a mechanism for reciprocating it so as to allow a single fruit to pass into the carrier from the feed-trough, substantially as herein described.

7. In a fruit-cutting and pit-removing device, the rotary toothed cutting-disk and the cutting-blade acting in conjunction therewith, a trough through which fruit is delivered into a carrier and from thence to the cutters, and the forked elastic yielding plate by which the single fruit at one time is allowed to pass into the carrier, in combination with the oscillating frame L, to which said plate and the carrier are attached, the projecting arm N, and the pins O, fixed upon the disk so as to engage said arm and oscillate the frame and its connected parts, substantially as herein described.

In witness whereof I have hereunto set my hand.

JOHN SMITH BRIGGS.

Witnesses:
 GEO. H. STRONG,
 J. A. BAYLESS.